June 16, 1953 C. PEAVY 2,641,819
TILE MANUFACTURING MACHINE
Filed Dec. 9, 1950 5 Sheets-Sheet 1
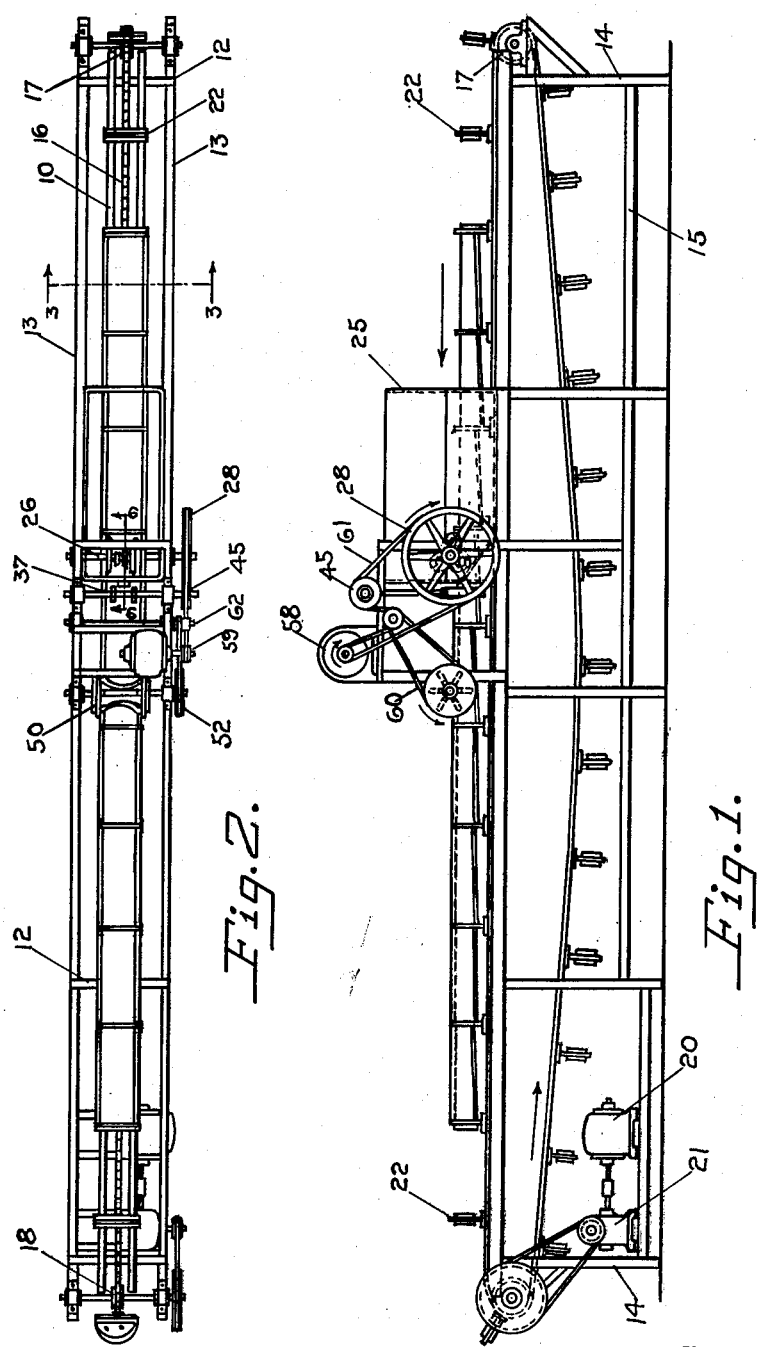
INVENTOR.
CLARENCE PEAVY.
BY
Salvatore G. Militana
ATTORNEY.

June 16, 1953  C. PEAVY  2,641,819
TILE MANUFACTURING MACHINE
Filed Dec. 9, 1950  5 Sheets-Sheet 2

INVENTOR.
CLARENCE PEAVY.
BY
Salvatore G. Militana
ATTORNEY.

June 16, 1953  C. PEAVY  2,641,819
TILE MANUFACTURING MACHINE
Filed Dec. 9, 1950 5 Sheets-Sheet 3

INVENTOR.
CLARENCE PEAVY.
BY
Salvatore G. Militana
ATTORNEY.

June 16, 1953  C. PEAVY  2,641,819
TILE MANUFACTURING MACHINE
Filed Dec. 9, 1950  5 Sheets-Sheet 4

INVENTOR.
CLARENCE PEAVY.
BY
Salvatore G. Militana
ATTORNEY.

June 16, 1953 C. PEAVY 2,641,819
TILE MANUFACTURING MACHINE

Filed Dec. 9, 1950 5 Sheets-Sheet 5

INVENTOR.
CLARENCE PEAVY.
BY
Salvatore G. Militano
ATTORNEY.

Patented June 16, 1953

2,641,819

UNITED STATES PATENT OFFICE 2,641,819

TILE MANUFACTURING MACHINE

Clarence Peavy, Miami, Fla.

Application December 9, 1950, Serial No. 199,979

5 Claims. (Cl. 25—41)

1

The present invention relates generally to the machine for manufacture of articles made of plastic material and is particularly directed to the manufacture of tiles, shingles, blocks, slump brick and the like, made of concrete. At the present time most concrete products such as tile are made by manual labor for the reason that there has not been developed any machinery or apparatus that can mass produce tile of uniform high quality at a lower unit cost than those manually produced. Attempts to manufacture tile by either the use of rollers or by reciprocating tampers have not proved successful inasmuch as machines using rollers fail to produce a high grade compact concrete product, while those machines attempting to use reciprocating tampers of inflexible material have failed to produce a uniformly shaped and properly slicked tile due to the peculiar working characteristics of a concrete mixture. The present invention on the other hand utilizes a system whereby: (1) a packing mechanism mounted within a hopper agitates the concrete mixture (better known in the art as "mud") and simultaneously packs the mud into pallets passing along the hopper; (2) at the exit of, but still within the hopper a knife blade mounted at the desired height therein removes excess mud from the pallets; (3) at the exit of the hopper and on the outside wall thereof, a reciprocating tamper is mounted, which tamper has its impacting surface made of flexible material such as rubber, etc., further packs the mud to form a highly compact tile; (4) forward of the tamper there is a rotatably mounted slicking or surface smoothing bar which produces the slick, pore closing surface that is required of weather exposed surfaces of concrete products.

Therefore, it is the principal object of the present invention to provide a simple but efficient machine for automatically producing barrel and shingle type tile by a uniform and continuous operation.

A further object of the present invention is to provide a tile manufacturing machine, that produces tile of a high grade quality as to strength and uniformity of shape due to the improved construction of the tamping and slicking mechanisms.

A further object of the present invention is to provide a machine that produces tile, etc. at a rapid rate with a minimum of labor required to attend the machine thus reducing the present cost of production of the articles being manufactured.

With these and other objects in view, the invention will be best understood from a consideration of the following detailed description taken in connection with the accompanying drawings, forming a part of the present specification with the understanding, however, that the invention is not confined to any strict conformity with the showing of the drawings, but may be changed or modified so long as such changes or modifications mark no material departure from the salient features of the invention as expressed in the appended claims.

In the drawings:

Figure 1 is a side view in elevation of the machine constructed in accordance with my invention.

Figure 2 is a top plan view thereof.

Figure 4:
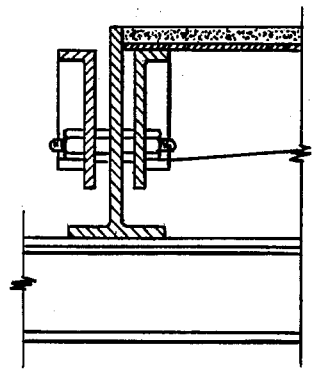
Figure 4 is a sectional view taken through 4—4 of Figure 3.

Referring now to the drawings wherein like numerals indicate corresponding parts throughout the several views and in particular to Figures 1 and 2, the numeral 10 refers to a pair of opposed channel irons upon which are secured wearing strips 11 to form the railing or track for an endless conveyor as is hereinafter explained in detail. The railings 10 are supported by a plurality of cross braces 12 whose ends are welded or otherwise secured to the angle iron supports 13 which in turn are supported by the legs 14 and leg braces 15. Mounted centrally between the railings 10 is an endless chain or conveyor 16 with which sprocket wheels 17 and 18 rotatably mounted at the ends of the railing 10 are made to mesh. The conveyor 16 is powered by a motor 20 connected to a reduction gear mechanism 21 and connected therewith by a pulley and belt arrangement as shown. Pallet carriers 22 of generally inverted T-shape in cross section and having a base portion 23 are welded to special fittings 9 pivotally mounted on the chain 16 at spaced intervals equal to the length of the pallets to form supports for the end portions of the pallets while the base portion 23 thereof extends across the railings 10, 10 riding on the wearing strips 11, 11.

Figure 3:
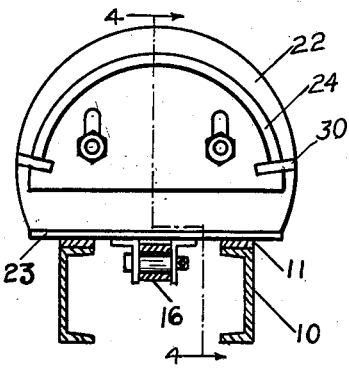
Figure 3 is a sectional view taken through 3—3 of Figure 2.
Figure 5:
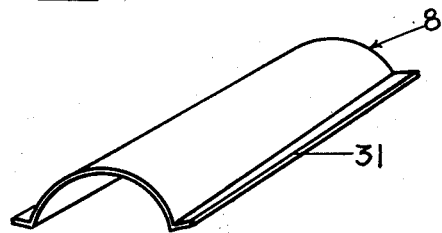
Figure 5 is a detailed view of the barrel type pallet utilized in the tile manufacture machine.
Figure 6:
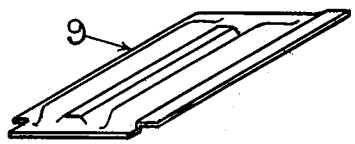
Figure 6 is a detailed view of the shingle type pallet.
Figure 8:
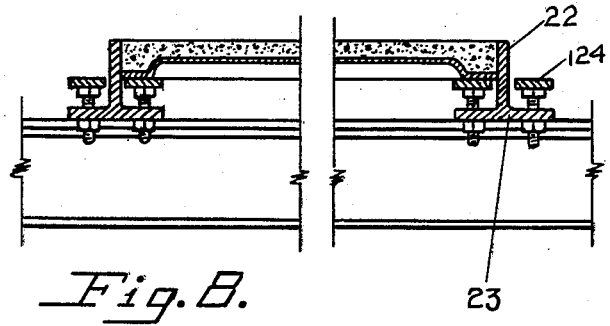
Figure 8 is a sectional view taken through 8—8 of Figure 7.
Figure 7:
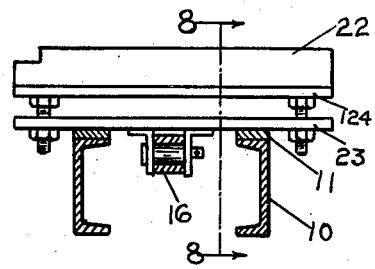
Figure 7 is a sectional view similar to Figure 3 showing a shingle tile holder on the conveyor system.

As seen by Figures 5 and 6 which show a barrel and shingle type pallet, the support members 24 and 124 (see Figs. 3, 4, 7 and 8) of the pallet carriers 22 must conform with the cross sectional shape of the end portions of the pallets. As seen in Fig. 3, the barrel tile is arcuate in cross section, therefore the support member 24 is arcuate to receive the end of the pallet and is secured to the carrier 22 so as to be spaced therefrom as shown. The pallet support member 24 is vertically adjustable so as to produce a tile of any desired thickness. Stop members 30, 30 on the support member 24 serve to hold the pallet in position thereon. As seen by Figs. 7 and 8, the shingle tile is substantially flat at its end portions, therefore the support members 124 is a flat bar, adjustably mounted vertically on the base portion 23 and spaced from the carrier 22.

Figures 9, 10:
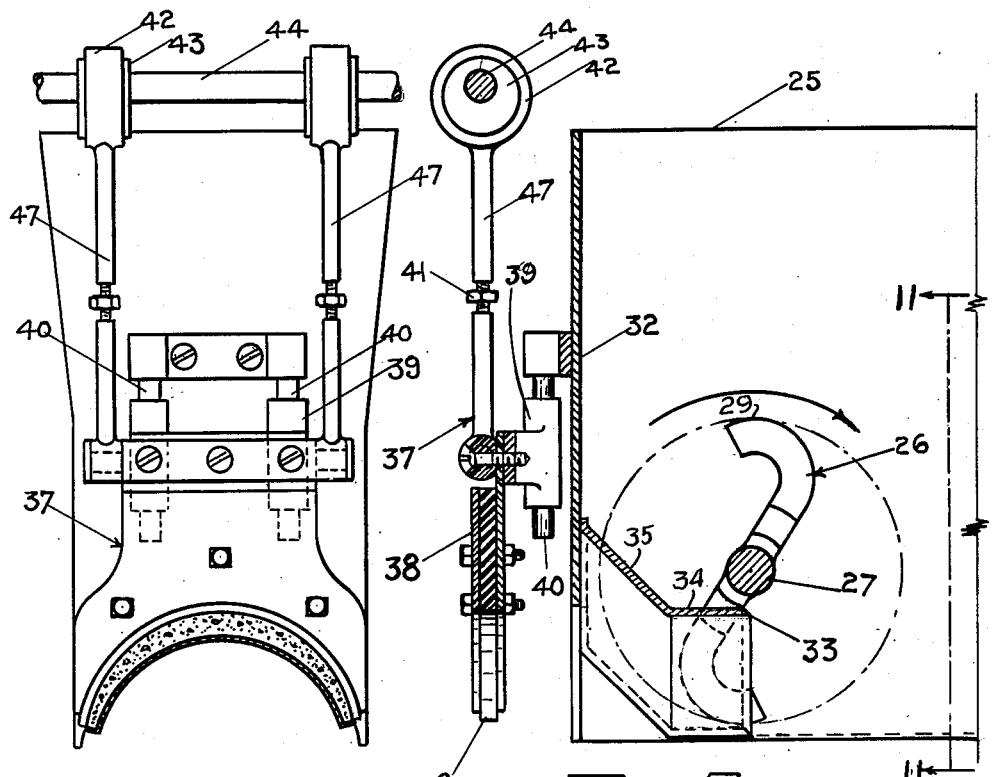
Figure 9 is an enlarged sectional view taken through 9—9 of Figure 2.
Figure 10 is a front view in elevation of the structure shown in Figure 9.
Figure 11:
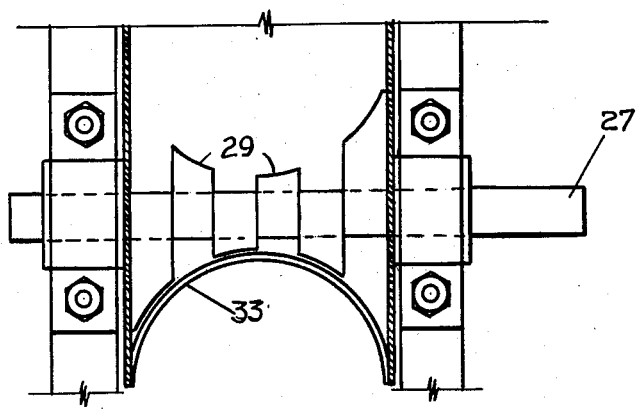
Figure 11 is a section taken thru 11—11 of Figure 9.

At approximately the middle portion of the machine and in the path of the conveyor 16, there is an open hopper 25 mounted on and supported by the angle irons 13. Within the forward or exit end of the hopper 25 a combination packing and agitating device 26 is mounted on the shaft 27 on the end of which a pulley 28 is secured for rotational movement thereof. Welded or otherwise secured to the shaft 27, there are a plurality of curved members 29 spaced about the shaft 27, each being of such a width that in a single complete revolution of the packing device 26, the entire mud along a width of the pallet has been packed at every point thereof. The packer 26 shown by Figs. 9 and 11 is for the barrel tile and it consists of approximately six curved members 29 whose length and arcuate impacting surface is such that upon rotation of the packing device the profile produced is the same as the curved external surface of the barrel tile itself. On the other hand the packing device 126 of the shingle tile producing machine (see Figs. 12–14 inclusive) consists of a plurality of curved members 129 spaced about the surface of the shaft 127. The length and shape of each of the members are all identical so that when the packing device 126 revolves during its normal operation, the profile produced thereby will be a flat surface similar to the exposed surface of the shingle tile being manufactured.

In order that all the pallets receive a measured amount of packed mud as they leave the hopper 25 a horizontally disposed cutting member 34 which is secured to the wall 32 of the hopper 25 has a knife blade edge 33 at its free end. This plate member 34 confines in a highly compact condition, the mud that had been packed therein by the revolving packing device 26 as the pallets are being carried therethrough by the conveyor 16. The cutting member 34 is curved in cross section (see Fig. 11) to conform with the shape of a barrel tile. An inclined wall member 35 extends from the free end of the cutting member 33 to the wall 32 to prevent mud from getting entrapped by the corner formed by the cutting member 33 and the wall 32.

Figures 12, 13:
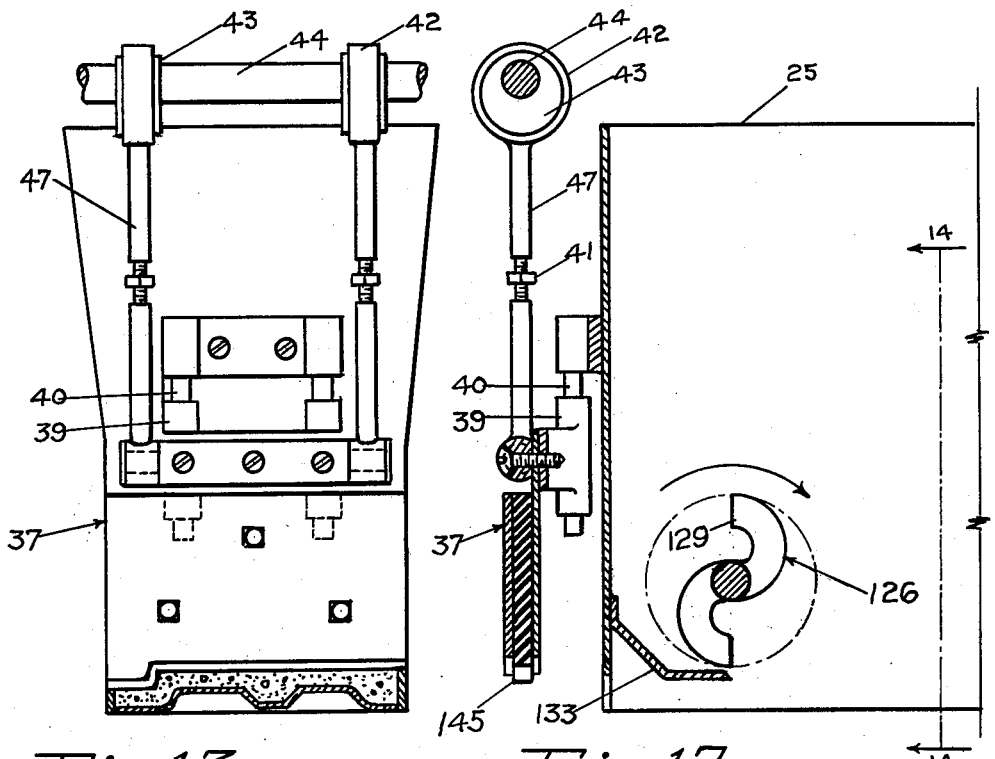
Figure 12 is a sectional view similar to Figure 9 showing the packing and tamping mechanism for the shingle type tile.
Figure 13 is a front view in elevation of the structure shown in Figure 12.
Figure 14:
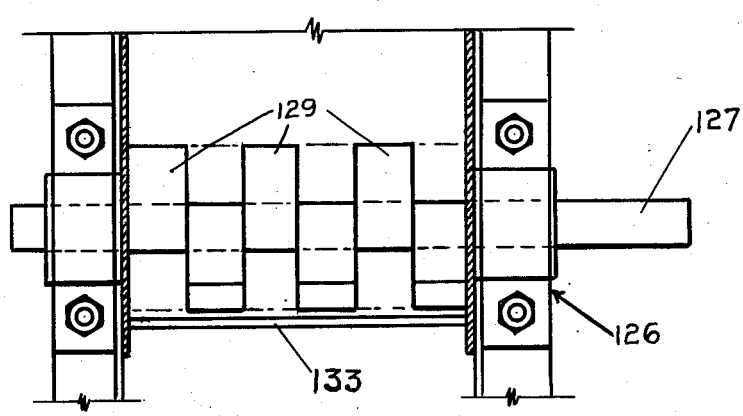
Figure 14 is a sectional view taken thru 14—14 of Figure 12.

Referring now to Figs. 12 and 14, the cutting member 133 is a flat member since the outer surface of a shingle tile is generally flat.

On the outside surface of the forward wall 32 of the hopper 25 there is mounted for reciprocating motion a tamping mechanism 37 consisting of a tamper 38 secured at each end to a bracket 39 slidably mounted on a pair of guide rods 40 that are secured to the wall 32. The upper end of the tamper 38 is secured to a pair of connecting rods 47, 47 each made up in two sections between which a bolt 41 having oppositely running threads is threaded thereon so as to readily adjust the height of the tamper 38 as desired. At the free end of each of the connecting rods 47 there is mounted a cam follower 42 which is rotatably mounted on cams 43 which in turn are secured to the rotatable shaft 44. A pulley 45 is mounted on one end of the shaft 44 (see Figs. 1 and 2). The tamper 38 consists of a pair of plate members between which a flexible member 8 such as rubber is placed extending beyond the edges thereof. The rubber 8 is curved along its exposed edge to conform with the shape of the barrel tile. The rubber tamping member 145 for the shingle machine (see Figs. 12 and 13) is generally flat and straight across the operating end thereof. It is generally known in the art that inflexible or all metal tampers do not produce acceptable tile for the reason that when the tamper impinges on the holders 22 there is set up in the machine a jarring which vibrates the tile and causes cracks to appear therein. This same result would be brought about if a large stone were present in the mud and is struck by the metallic tamper. The use of the rubber or flexible tamper 37 prevents the setting up of vibrations in the machine as the tamper strikes the holders 22 and thus producing an evenly grained tile compact to a predetermined degree depending on the resiliency of the rubber or flexible tamper and the stroke of the reciprocating movement thereof.

Figures 17, 18:
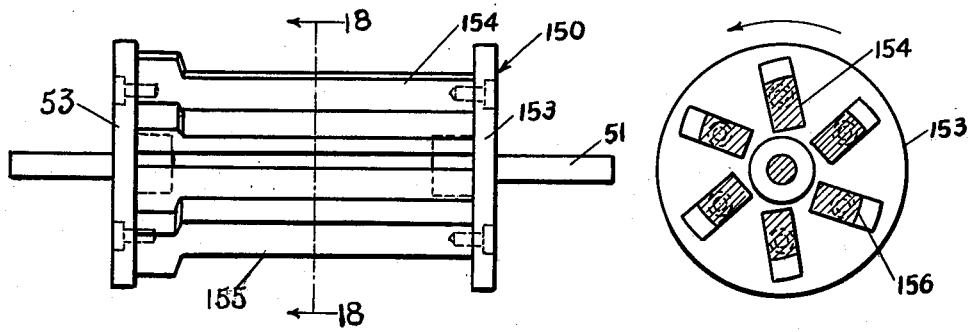
Figure 17 is a detailed plan view of the shingle tile surface slicking or smoothing mechanism.
Figure 18 is a sectional view taken through 18—18 of Figure 17.
Figures 15, 16:
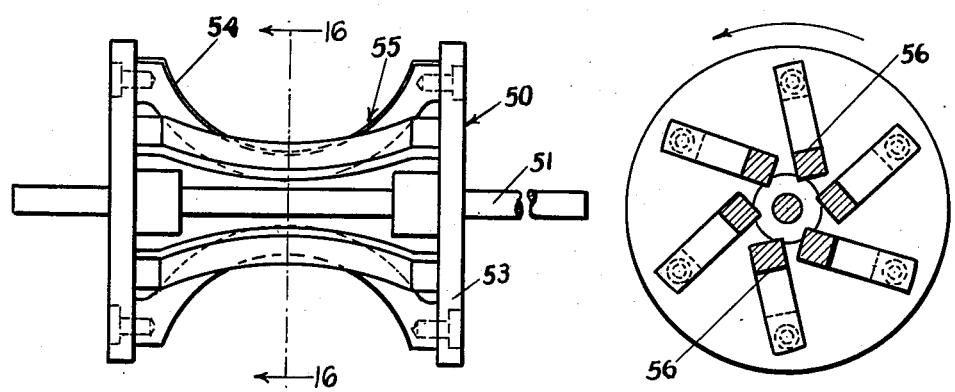
Figure 15 is a detailed plan view of the barrel tile surface slicking or smoothing mechanism.
Figure 16 is a sectional view taken through 16—16 of Figure 15.

Forward of the tamping mechanism 37 a distance of more than the length of one pallet, there is mounted the slicking mechanism 50 whose function is to provide the tile being formed with a smooth outer surface which seals the exposed pores or cellular structure normally found in concrete products. The slicker 50 is mounted on a shaft 51 in the path of the pallets being carried by the conveyor 16 with a pulley 52 secured on one end of the shaft 51 as best seen in Figs. 1 and 2. The slicker 50 consists of a pair of end plates 53, 53 secured to the shaft 51 with a plurality of bars 54 extending between the plates 53 and secured at their ends by bolts (see Figs. 15 and 16). Each of the bars 54 consists of an arcuate shape generally designated by the numeral 55 which is identical to the curvature of the outer surface of a barrel tile, and the arcuate surface itself consists of a portion 56 curved in a direction from the leading to the trailing edge thereof. The bars 54 are adjustable so that they may be pivoted about their point of contact with the end plates 53, 53. The amount that it is necessary to pivot the bars 54 away from the plane passing through the axis of the shaft 51 in order for the slicker 50 to produce a perfectly smooth surfaced tile is determined by the coarseness of the materials used in the mud. If the bars 54 were lined up with the axis of the shaft 51, the leading edge of the bars 54 would tend to strike and dislodge any coarse particles rather than press them into the mud as it would if the leading edge is slightly removed from the surface of the mud as is caused by the aforementioned tilting thereof. The slicker 150 for the manufacture of shingle tile is substantially similar to that of the barrel tile except for the shape of the slicking bars 154 as seen in Figs. 17 and 18. Just as the bars 54 of the barrel tile slicking bar, the bars 154 of the shingle tile slicker 150 are shaped to conform with the shape of the shingle tile and have a curved or arcuate portion 156 extending from the leading to the trailing edges thereof. The slicking bars 154 are also pivoted in a direction away from the plane passing thru the axis of the shaft 51 so that the leading edge of the slicking bar 154 is closer to the axis of the shaft 51 than the trailing edge. The packing mechanism 26, the tamper 37 and the slicker 50 are operated by a single motor 58 and pulley 59 interconnected by the belts 60 and 61 with the idler pulley 62 interposed to result in the proper direction of rotation of the various mechanisms. The packing mechanism 26 revolves in the direction of the moving conveyor while the slicking mechanism 50 rotates in the reverse direction.

In the normal operation of the machine, pallets are placed on the pallet supports 24 so as to rest between a pair of pallet holders 22, prior to its entry into the hopper 25. There the packing and agitating rotor 26 packs mud into the pallet where the cutter member 33 permits only a measured quantity of mud to remain thereon as it leaves the hopper 25. The reciprocating tamper 38 then compacts the mud in the pallet as it then moves along towards the slicking mechanism 50 which gives the tile a smooth even outer surface before the pallets reach the position of the sprocket wheel 18, where they are removed from the conveyor 16 as finished tile. If it is desired to coat or paint the outer surface of the tile during the process of manufacturing the tile, the necessary apparatus can be placed on the machine forward of the slicker 50. It is to be noted that the pallet 8 of the barrel type tile is different from the conventional pallet used heretofore. The pallet 8 has a curvature of constant radius but is tapering from the larger forward to the smaller rearward end. The thickness of the tile itself is determined by the width of the flange 31. In the instant device, the flange 31 is of narrow width at the larger end of the pallet 8 and wider at the smaller end thereof. This results in a saving of material making up the tile and consequently a more economical and lighter tile with no loss in over-all strength.

Having now disclosed my invention and realizing that, in view of my disclosure many modifications in details of construction or design will readily occur to those skilled in the art, I do not choose to limit myself except as in the appended claims.

What I claim is:

1. In a tile manufacturing machine, the combination of a hopper for plastic material, said hopper having an opened bottom portion, a shaft rotatably mounted within said hopper adjacent an end wall of said hopper, a plurality of arcuate members having one end secured to said shaft and the other end extending radially therefrom, the sum total of said free ends forming a profile substantially identical to that of the tile being manufactured, means for rotating said shaft, and plate means mounted on said end wall, said plate means having an end portion extending to adjacent the free ends of said arcuate members substantially tangential to the arc described by said arcuate members when said shaft is rotated.

2. In a tile manufacturing machine having an open bottom hopper and a pallet carrying belt movable along the open portion of said hopper leaving said hopper at a discharge end thereof, the combination of a shaft rotatably mounted within said hopper adjacent an end wall at the discharge end of said hopper, means for rotating said shaft in a direction so that the bottom of said shaft moves in the same direction as said movable belt, a plurality of arcuate members having one end secured to said shaft and the other end extending radially from said shaft and curved in a direction away from the rotational movement of said shaft, and a plate member secured to said end wall of said hopper and extending to a position adjacent said free ends of said arcuate members substantially tangential to the arc described by said arcuate members when said shaft is rotated.

3. The structure as recited in claim 1 wherein said end portion comprises a horizontally disposed plate shaped substantially identical with the profile of the exposed surface of the tile manufactured by said machine.

4. In a tile manufacturing machine, an opened bottom hopper, a movable endless conveyor mounted along the opened portion of said hopper, pallet support means mounted on said conveyor adapted to receive pallets, a shaft rotatably mounted within said hopper above said conveyor adjacent the discharge end of said hopper, means for rotating said shaft in the direction whereby the bottom of said shaft moves in the same direction as said endless conveyor, a plurality of arcuate members mounted on said shaft, pallets removably positioned on said pallet support means, and a plate member mounted in said hopper in spaced relation to said pallets, said plate member being mounted forward of said packing arcuate members and having an end portion extending to adjacent said arcuate members substantially tangential to the arc described by said members.

5. In a tile manufacturing machine, a support, an opened bottom hopper mounted on said support, said hopper having a discharge end, an endless conveyor movably mounted on said support along and within the opened portion of said hopper, power means for moving said conveyor in a direction whereby said conveyor leaves said hopper at the discharge end thereof, pallet support means mounted on said conveyor, pallets removably positioned on said pallet support means, rotatable shaft mounted in said hopper transverse to the path of movement of said conveyor, means for rotating said shaft in the direction whereby the bottom of said shaft moves in the same direction as said conveyor, a plurality of arcuate members each having one end secured to said shaft and a free end extending radially therefrom, said free ends being curved in a direction away from the rotational movement of said shaft, a plate member mounted in said hopper adjacent said discharge end, said plate member having an end portion positioned above and along the path of movement of said conveyor extending to a position adjacent said free ends of said arcuate members and being substantially tangential to the arc described by said arcuate members when said shaft is rotated.

CLARENCE PEAVY.

References Cited in the file of this patent

UNITED STATES PATENTS

| Number | Name | Date |
|---|---|---|
| 1,750,113 | Martin | Mar. 11, 1930 |
| 1,757,562 | Fey | May 6, 1930 |
| 1,929,301 | Batcheller | Oct. 3, 1933 |
| 2,185,959 | Vogel-Jorgensen | Jan. 2, 1940 |
| 2,545,366 | Mandryl | Mar. 13, 1951 |

FOREIGN PATENTS

| Number | Country | Date |
|---|---|---|
| 22,365 | Denmark | August 1917 |
| 372,241 | Germany | Mar. 26, 1923 |